Jan. 28, 1969  E. RUCHSER  3,424,427
FLUID-PRESSURE VALVE
Filed Dec. 1, 1967
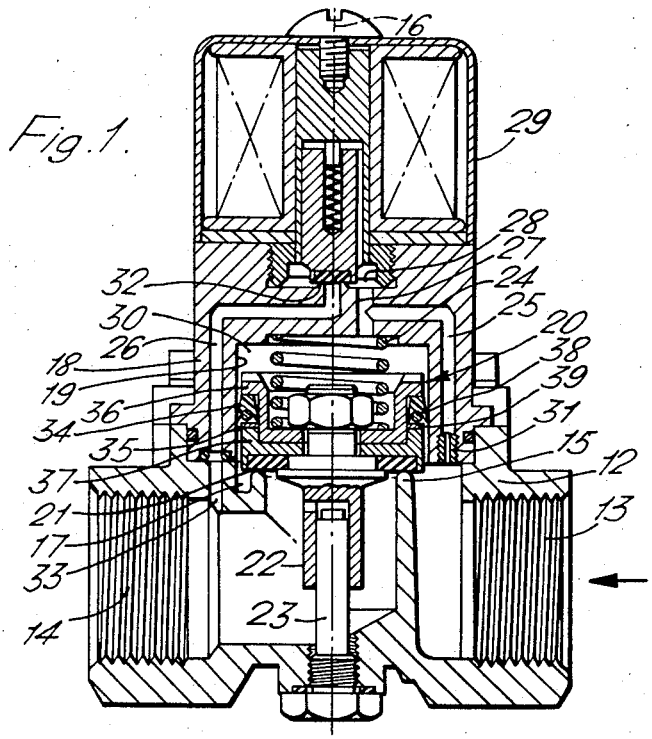
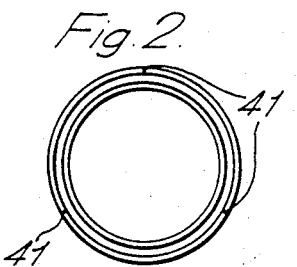
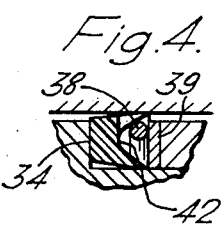
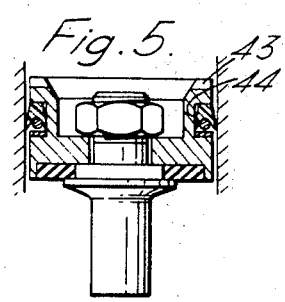
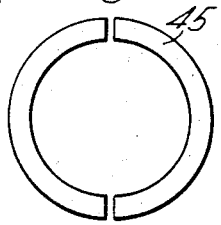
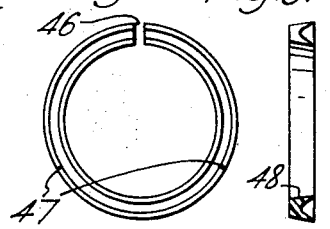
INVENTOR:
ERICH RUCHSER
BY: *Malte & Malte*
ATTORNEYS

United States Patent Office 3,424,427
Patented Jan. 28, 1969

3,424,427
FLUID-PRESSURE VALVE
Erich Ruchser, Stetten-Remstal, Germany, assignor to Erich Herion, Sen., Stuttgart-Frauenkopf, Germany
Filed Dec. 1, 1967, Ser. No. 687,263
Claims priority, application Germany, Dec. 6, 1966, H 61,204
U.S. Cl. 251—30                    10 Claims
Int. Cl. F16k *31/12, 31/143;* F16j *9/20*

ABSTRACT OF THE DISCLOSURE

A fluid-pressure valve, such as a hot water valve, to be controlled electromagnetically, for example, so that a fluid under pressure can act on the valve to open the latter. The valve has a valve housing provided with an inlet and an outlet and fixedly carrying in its interior a valve seat which is engaged by a movable valve closure when the latter is in its closed position, this closure being displaceable to an open position spaced from the valve seat. The valve closure is carried by a control piston which is received in the hollow interior of a control cylinder which is carried by a valve housing, this cylinder having an inner cylindrical surface which surrounds the piston. The piston is formed with an outer groove which receives a sealing means which engages the inner surface of the control cylinder, and this sealing means includes a semi-hard plastic sealing ring having an outer lip which is formed with a plurality of interruptions circumferentially distributed therealong so that this outer lip can more easily be deflected outwardly into engagement with the inner surface of the cylinder. A spreader spring is situated in a groove of the sealing ring and engages the outer lip to urge the latter outwardly into engagement with the inner surface of the control cylinder.

Background of the invention

The present invention relates to valves.

More particularly, the present invention relates to fluid-pressure actuated valves, and in particular to a valve of this type which can be electromagnetically actuated to provide for the passage of a fluid such as hot water therethrough.

Such valves may conventionally be provided with a control piston connected to a valve closure for displacing the latter between its open and closed positions and with a control cylinder which has a hollow interior receiving the control piston.

A valve of this general type is disclosed, for example, in German Patent 1,064,770. In the construction shown in this latter patent the control piston is provided with a suitably shaped sealing ring which is connected to the control piston. Such a sealing arrangement, however, has only limited utility particularly when foreign bodies are suspended in the pressure fluid so that under such conditions the piston becomes easily jammed in the cylinder, resulting in failure of the valve. Moreover, with a valve of this type the forces required for displacing the valve between its open and closed positions are undesirably great inasmuch as the semi-rigid sealing ring has a very high coefficient of friction and requires a very large spreading force to maintain it in slidable engagement with the inner cylinder surface.

It is also known to provide such pistons with inserted apparently metallic sealing rings as illustrated, for example, in German Patent 607,917. However, sealing rings of this type are not suitable for all operating conditions, and in particular they are not suitable for use with hot fluids. They also have the particular disadvantage of being difficult to lubricate. In the event that relatively large tolerances are encountered in the manufacture of such structures, such sealing rings do not provide an adequate seal. Conventional sealing rings of rubber or the like also are not capable of being used as sealing rings for all pressure fluids, particularly for hot pressure fluids, since with fluids of this latter type such sealing rings do not hold their seal.

Summary of the invention

It is thus a primary object of the present invention to provide a valve structure of the above general type which will avoid the above drawbacks.

In particular it is an object of the invention to provide a valve structure which will operate reliably and properly under extreme operating conditions.

Also, it is an object of the invention to provide a valve structure of this type with a seal which will have a long operating life under all operating conditions, such as cold and hot conditions where the valve structure of the invention is used over a wide range of temperatures.

In addition, it is an object of the present invention to provide a construction of this type which will require only a relatively small force to displace the valve between its open and closed positions.

Furthermore, it is an object of the present invention to provide a valve of this type with a sealing structure which has the capability of easy adjustment and which can be very easily mounted on the control piston, even though the material used for the sealing ring is one of relatively small elasticity which can be deformed only with difficulty.

It is furthermore an object of the present invention to provide a valve structure of the above general type which lends itself to different uses.

It is also an object of the present invention to provide a valve of this general type which can be assembled in one of a plurality of different ways providing different responses to a particular pressure of the fluid which flows through the valve.

In accordance with the invention the valve includes a valve housing which has an inlet and an outlet and which fixedly carries in its interior a valve seat which is engaged by a movable valve closure when the latter is in its closed position. A control piston is connected to the valve closure for displacing the latter between its closed position and an open position where it is spaced from the valve seat, and a control cylinder is carried by the valve housing and has a hollow interior into which the control piston extends, this hollow interior of the control cylinder being defined in part by an inner cylindrical surface which surrounds the piston. The piston has an outer peripheral groove in which a sealing means is located, and this sealing means includes, in accordance with the invention, a semi-hard plastic sealing ring formed in one end face with a groove which provides the sealing ring with an inner lip directed toward the common axis of the piston and cylinder and with an outer lip directed toward and engaging the inner surface of the control cylinder. This outer lip of the sealing ring of the invention is formed with a plurality of interruptions extending radially therethrough and circumferentially distributed along this outer lip, and the sealing means of the invention further includes a spreader spring which is situated in the groove of the sealing ring and which presses against the outer lip thereof to press this outer lip into engagement with the inner surface of the cylinder.

Brief description of the drawings

The invention is illustrated by way of example of the accompanying drawings which form part of this application and in which:

FIG. 1 is a longitudinal sectional elevation of one pos-

FIG. 2 is an end view of a sealing ring of the invention as seen when looking toward the groove thereof;

FIG. 3 is a transverse section of the ring of FIG. 2 taken in a plane which coincides with one of the interruptions in a lip of the ring;

FIG. 4 is a fragmentary radial section illustrating the manner in which the sealing means of the invention is assembled within a control piston groove;

FIG. 5 is a fragmentary, partly sectional elevation showing another embodiment of a control piston capable of being used with a sealing means of the invention;

FIG. 6 is a plan view illustrating a pressure washer used with the embodiment of FIG. 5;

FIG. 7 is an end view of the sealing ring of the embodiment of FIG. 5, as seen when looking toward the grooved face thereof; and FIG. 8 is a transverse section of the sealing ring of FIG. 7 taken in a plane which passes through a radial interruption of the sealing ring.

*Description of preferred embodiments*

Referring now to FIG. 1, the valve structure illustrated therein includes a valve housing 12 provided with an inlet 13 and an outlet 14. Between the inlet 13 and the outlet 14, the housing 12 fixedly carries a valve seat 15 which has its center situated in a longitudinal axis 16 which extends upwardly through the circular valve seat 15. This valve seat 15 is symmetrically situated with respect to the inlet 13 and the outlet 14. The inlet 13 of the valve housing 12 leads into an annular chamber 17 which surrounds the valve seat 15 and which is closed at its upper end by a control cylinder 18 of a unit which is mounted on the housing 12. This control cylinder 18 is formed with an inner cylindrical surface 19 which surrounds a control piston 20 which is received within the hollow interior of control cylinder 18. This control piston 20 is connected with a valve closure 21 in the form of a ring which engages the seat 15 to close the valve. Thus, the valve closure 21 is adapted to coact with the valve seat 15 and has a central pin 22 formed at its lower end with an upwardly directed bore which receives a centrally situated guide pin 23 carried by the housing 12 so as to guide the closure 21 for movement along the axis 16.

A spring 24 presses against the top end of the control piston 20 so as to urge the latter downwardly and thus urge the valve closure 21 to its closed position engaging the valve seat 15. This spring is located in the hollow interior of the control cylinder 18. The wall of the cylinder 18 is formed with a pair of control passages 25 and 26 which at their vertically extending portions, as viewed in FIG. 1, are parallel to the axis 16 and are equidistantly spaced therefrom. One of these control passages, namely the passage 25, communicates with the annular chamber 17 and leads to a transversely extending branch 27 one end of which communicates with an annular chamber 28 of a valve 29 which is initially actuated to release the primary valve 15, 21 for operation, this valve 29 being electromagnetically controlled, for example. The other end of the branch 27 of the control passage 25 communicates with the hollow interior of the control cylinder 18 so as to feed into the spring chamber 30 of the cylinder in which the spring 24 is located. At its inlet end where it communicates with the annular chamber 17, the control passage 25 is provided with a throttling means in the form of an axially bored throttling member 31 which is threaded into the cylinder 18 at the lower inlet end of the passage 25. The other control passage 26 communicates with the center of the valve seat 32 of the control valve assembly 29, and this control passage 26 leads from the space which is surrounded by the valve seat 32 to the outlet 14 by way of an extension 33 which is formed in a housing 12 so as to form an extension of the control passage 26.

The control piston 20 is sealed with respect to the inner cylindrical surface 19 and the control cylinder 18 by way of sealing means of the invention which includes a grooved sealing ring 34, this sealing ring also communicating with the operating chamber 35 which is situated beneath the piston 20 and which communicates with the annular chamber 17 so that this operating chamber 35 communicates directly with the chamber 17.

The sealing ring 34 is made of a semi-hard plastic, such as, for example, polytetrafluoroethylene. The control piston 20 includes a pair of components 36 and 37 which terminate in outer peripheral end surfaces directed toward each other and defining between themselves a groove which receives the sealing means of the invention, and thus it is between these surfaces of components 36 and 37 that the sealing ring is situated. The sealing ring 34 is formed with a groove directed downwardly toward the component 37, as viewed in FIG. 1, and within this groove is situated a spreader spring 38 in the form of a circular wire spring which is split and which, when unstressed, has a diameter greater than that of the inner surface 19 of the cylinder 18. Thus, the spreader spring 38 situated in the groove of the sealing ring 34 urges an outer lip of the latter outwardly into engagement with the surface 19, while this ring 34 has an inner lip which is directed toward the common axis of the cylinder and piston. Furthermore, within the groove of the piston 20 there is situated at least one flat washer 39 which presses the spreader spring 38 into the groove of the sealing ring and which has a thickness which determines the spreading force which acts on the outer lip of the sealing ring, so that by changing one washer of one thickness for another washer of a different thickness it is possible to regulate this spreading force.

As may be seen from FIGS. 2-4, the grooved sealing ring 34 is formed at its outer lip 40 with three radially extending interruptions 41 in the form of simple slits which are angularly spaced one from the other by 120°, so that these interruptions 41 are uniformly distributed circumferentially along the outer lip 40. Moreover, as is apparent particularly from FIGS. 3 and 4, as well as FIG. 1, between its outer lip 40 and its inner lip 40' the groove 42 of the sealing ring has a wedge-shaped cross section, this groove 42 receiving the spreader spring 38. The washer 39 is indicated in FIG. 4 as well as in FIG. 1, and this washer presses the spreader spring 38 into the groove 42 while the spring 38 presses the outer lip 40 of the sealing ring 34 against the inner surface 19 of the control cylinder 18. As a result of the interruptions 41 which pass through the outer lip 40 from the outer edge thereof to the innermost portion of the groove 42, the force required to spread the outer lip and the frictional resistance to movement of the outer lip with respect to the surface 19 are both reduced, with the extent of reduction being determined by the number of interruptions 41. The reduction in friction results from the reduced spring force which is required to spread the outer lip against the inner surface 19 of the cylinder 18.

FIG. 5 illustrates another embodiment of a control piston. In this case the control piston 43 has a one-piece construction and is formed at its outer periphery with an annular groove 44 which is closed at all parts except its outermost portion which is directed toward the inner surface 19 of the cylinder 18. This groove 44 receives in this case a split washer 45, which is shown in FIG. 6 as being composed of a pair of semi-circular portions. As may be seen from FIG. 7, the sealing ring in this case is formed with a pair of interruptions 47 identical with the interruptions 41 and with a third interruption 46 which passes completely through the sealing ring in a plane which contains the axis thereof, so that the sealing ring can be spread at the interruption 46 when the sealing ring is introduced into the groove 44. The pair of interruptions 47 and the interruption 46 are uniformly distributed circumferentially about the sealing ring at angular distances of 120° from each other. FIG. 8 shows the sealing ring 48 as it appears in a sectional view taken in a plane which passes through the complete interruption 46.

The above-described pressure-operated valve operates as follows:

In the position illustrated in FIG. 1 the pressure fluid, such as hot water under pressure is received in the inlet 13 and, after flowing through the throttle 31 and the control passage 25, is received in the spring chamber 30 located over the control piston 20. The pressure of the fluid which in this way reaches the chamber 30 acts on the control piston 20 together with the spring 24 so as to urge the control piston 20 downwardly and thus maintain the valve closure 21 on the valve seat 15, pressing thereagainst to maintain the path through the primary valve 15, 21 closed.

Assuming now that a circuit is closed in any suitable way to energize the electromagnetic valve assembly 29, then the armature of this valve assembly is raised so as to displace the closure thereof away from the valve seat 32 and now the fluid which reaches annular chamber 28 which surrounds the valve seat 32 and which flows to the latter chamber 28 from the branch 27 at the end of the control passage 25 can flow through the space defined by the valve seat 32 and along the control passage 26 to the outlet 40 of the primary valve. The result is that the pressure of the fluid in the chamber 30 drops, and it is to be noted in this connection that the cross-section of the control passage 26 is greater than that of the throttle 31 and the leakage loss at the sealing ring 34. Therefore, a pressure differential is created resulting in raising of the control piston 20 in opposition to the spring 24, thus opening the valve 15, 21.

During assembly of the components of the valve, the grooved ring 34 of FIGS. 1–4 is not deformed when situated between the piston components 36 and 37. On the other hand, with the embodiment of FIGS. 5–8 the grooved sealing ring 46 is spread at its radial interruption 46 during introduction of this ring into the groove 44. Then the split washer 45 and the spreader spring 38 are introduced into the groove 44.

As a result of the radially directed interruptions 41, 46 and 47, the relatively great stiffness of the outer sealing lip of the rings 34 or 48, resulting from the material used for these rings, is sharply reduced so that the resistance to deformation of the lip 40 is reduced and a weaker spreader spring 38 can be used for maintaining the sealing lip 40 in engagement with the surface 19 of the control cylinder 18 under all operating conditions and during large temperature changes in the pressure fluid.

Moreover, the structure illustrated in FIG. 1 provides the advantage of enabling the cylinder 18 to be mounted on the valve housing 12 in one of a pair of positions which are angularly displaced about the axis 16 by 180° with respect to each other so that in this way it becomes possible to change the outlet 14 to an inlet and the inlet 13 to an outlet. When the structure is modified in this way a throttled flow of fluid will still reach the spring chamber 30, but substantially the entire downwardly directed surface of the control piston 20 is acted upon by the fluid pressure at the inlet of the valve, whereas with the arrangement of FIG. 1 it is only the outer peripheral portion of the downwardly directed surface of the piston 20 which is acted upon by the fluid pressure at the inlet 13. In this way it becomes possible with this simple reversal of the position of the cylinder 18 to adapt the valve to different operating conditions.

It is to be noted that with the structure of the invention where the sealing ring is made of a semi-hard plastic such as polytetrafluoroethylene, there is the advantage that such a material is particularly suitable for values to be used in hot water pressure systems, since the sealing ring when made of such material will have the required high pressure acting on its outer lip to press it against the inner surface of the control cylinder as a result of the interruptions in this outer lip. Such interruptions in the outer lip can be used in a valve structure of the above type since as a rule the flow path of the pressure fluid will have a smaller cross section upstream of the closed control valve 29 and a larger cross section downstream of the latter, so that it is possible to achieve a pressure drop when the auxiliary control valve 29 is actuated. As a result, a lack of a full seal at the regions of the interruptions in the outer lip of the sealing ring will have no influence on the operation.

The embodiment of FIGS. 5–8 provides the advantage of a one-piece structure for the control piston while at the same time retaining the advantages of a semi-hard sealing ring which nevertheless can have its outer lip spread with a relatively small spring force against the inner surface of the control cylinder. It is to be noted that with this construction there is a very simple structure for mounting the relatively stiff sealing ring on the control piston.

What is claimed is:

1. In a valve through which a fluid under pressure is adapted to flow, a valve housing having an inlet and an outlet, a valve seat fixed to said valve housing in the interior thereof along a path of flow from said inlet to said outlet, a valve closure having a closed position engaging said valve seat and an open position displaced therefrom, a control piston fixed to said valve closure for displacing the latter between said positions thereof, a control cylinder having a hollow interior into which said control piston extends, said hollow interior of said cylinder being defined in part by a cylindrical inner surface which coaxially surrounds said control piston, and sealing means for providing a sealed sidable movement between said piston and cylinder, said piston being formed with a groove directed toward said inner cylindrical surface of said cylinder and receiving said sealing means and said sealing means including a sealing ring of semi-hard plastic formed in one end face with an annular groove providing said sealing ring with an inner lip directed toward a common axis of said piston and cylinder and an outer lip directed toward and engaging said inner cylindrical surface of said cylinder, said outer lip being formed with a plurality of radial interruptions dividing said outer lip into a plurality of individually deformable portions capable of being pressed against said inner surface of said cylinder with a force less than that which would be required if said outer lip were not interrupted, and a spreader spring situated in said groove of said sealing ring and urging said outer lip thereof away from the common axis of said piston and cylinder into engagement with said inner surface of said cylinder.

2. The combination of claim 1 and wherein said sealing ring is made of polytetrafluoroethylene.

3. The combination of claim 1 and wherein said outer lip of said sealing ring is formed with three radial interruptions circumferentially distributed along said outer lip.

4. The combination of claim 1 and wherein said groove of said sealing ring which receives said spreader spring is of a wedge-shaped cross section, said inner and outer lips of said sealing ring extending axially of said piston and cylinder and a washer situated in said groove of said piston, said groove of said sealing ring being directed toward said washer and said washer engaging said spreader spring for pressing the latter axially into said groove of said sealing ring.

5. The combination of claim 1 and wherein said control piston includes at least two components, which respectively terminate, at end faces of said components which are directed toward each other, in outer annular surfaces respectively situated in parallel planes perpendicular to the common axis of said piston and cylinder and respectively defining opposed sides of said piston groove in which said sealing means is situated.

6. The combination of claim 1 and wherein said control piston is a one-piece member and is formed at its outer periphery with a groove which is closed at all parts except its outer portion which is directed toward the inner surface of said cylinder, for receiving said sealing means in said piston groove, and one of said interruptions of said sealing ring passing completely therethrough in a radial plane which contains said common axis of said cylinder and piston.

7. The combination of claim 6 and wherein a split washer having a pair of semicircular portions is situated in said piston groove and engages said spreader spring for urging the latter into said groove of said sealing ring.

8. The combination of claim 1 and wherein said valve housing has an axis extending centrally through said valve seat perpendicularly to a plane which contains the said valve seat, and said inlet and outlet being symmetrically situated with respect to said axis, said control cylinder being formed in its wall which surrounds said inner surface thereof with a pair of control passages equidistantly situated from said axis and extending at least in part parallel thereto, said parts of said control passages which extend parallel to said axis respectively communicating with said inlet and outlet and said control cylinder being carried by said valve housing in one of a pair of positions which are angularly displaced with respect to each other about said axis by 180°, so that in one of said positions of said cylinder one of said control passages will communicate with said inlet and the other of said control passages will communicate with said outlet while in the other of the positions of said cylinder said one control passage will communicate with said outlet while said other control passage will communicate with said inlet.

9. The combination of claim 8 and wherein said one of said control passages carries at its end which communicates with said inlet a throttling means for throttling the flow of fluid from said inlet into said one control passage.

10. The combination of claim 9 and wherein an electromagnetic valve means coacts with said control passages of said cylinder for determining the position of said valve closure, said control passage which communicates with said outlet terminating distant therefrom in a valve seat closed by said electromagnetic valve means when the latter is unenergized, and said control passage which communicates with said inlet communicating with the hollow interior of said control cylinder at a side of said control piston which is directed away from said valve seat and also communicating with said control passage which leads to said outlet when said electromagnetic valve means is open upon energizing thereof, and a spring situated in the hollow interior of said control cylinder and acting on said control piston to urge the latter in a direction pressing said valve closure member against said valve seat, whereby when said electromagnetic valve means is energized to place said control passages in communication with each other the pressure of the fluid, which acts together with said spring on said control piston for urging the latter in the direction which maintains said valve closure in its closed position, drops by communication with said valve outlet so that the pressure of the fluid at said inlet can then displace said control piston in opposition to the spring which acts thereon in a direction which will displace said valve closure from said valve seat.

References Cited
UNITED STATES PATENTS 3,307,823    3/1967    Greer _____ 251—30

ARNOLD ROSENTHAL, *Primary Examiner.*

U.S. Cl. X.R.

251—44, 62; 277—216